J. Kohler,
Lifting Jack.
N°76,927.   Patented Apr. 21, 1868.
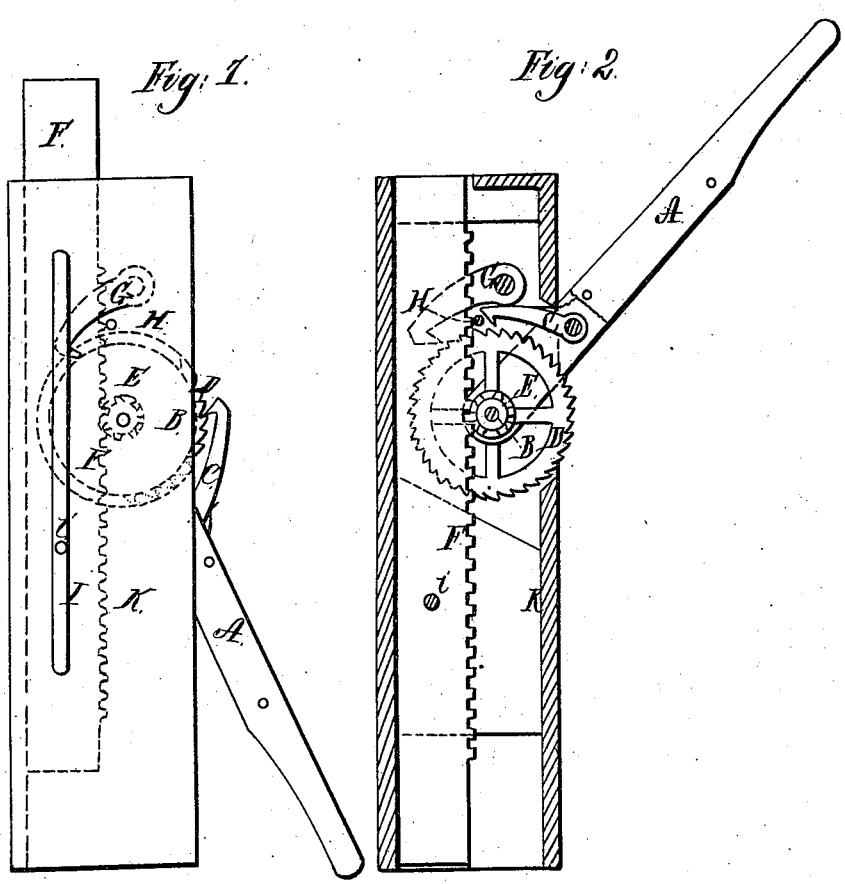
Witnesses:
John Paar
A. Keill
Inventor:
John Kohler

United States Patent Office.

JOHN KOHLER, OF NEW YORK, N. Y.

*Letters Patent No. 76,927, dated April 21, 1868.*

IMPROVEMENT IN LIFTING-JACKS.

*The Schedule referred to in these Letters Patent and making part of the same.*

TO ALL WHOM IT MAY CONCERN:

Be it known that I, JOHN KOHLER, of the city, county, and State of New York, have invented a new and useful Improvement in Carriage-Jacks; and do hereby declare that the following is a full and exact description thereof, reference being had to the accompanying drawings making part of this specification, of which—

Figure 1 is a side elevation, and

Figure 2 a sectional elevation.

This invention relates to a novel device for raising the axles of vehicles, for the purpose of removing the wheels for lubrication, as well as for elevating heavy objects, and consists of a forked lever, embracing a ratchet-wheel and pawl, which operate a pinion, rack, and retaining-pawl, the whole being contained in a wooden framework, as shown in the drawings.

In the said drawings, A represents the bifurcated hand-lever, placed on the main shaft B, and embracing in its fork the pawl C and ratchet-wheel D. On the hub of this wheel D is cast a pinion, E, which operates a sliding-rack, F. G is the retaining-pawl, and H is a stationary pin, which aids in disengaging the pawls from the ratchet-wheel. I is a slot in the case K, through which a pin, $i$, firmly secured to the rack, moves up and down with the said rack.

The operation of my invention is as follows: By placing the jack under the axle of a carriage, and actuating the lever A, the pawl C will engage with the ratchet-wheel D, and rotate the same, as the lever is pressed downward, and the pinion E, attached to the said wheel, playing into the rack E, will slide the rack upward, thereby raising the axle and wheels of the carriage from the ground, while the retaining-pawl G, engaging with the wheel D, will hold the rack in position (see fig. 1) as long as required; and when it is desired to lower the axle and wheel or wheels to their original position on the ground, the lever A is raised, (see fig. 2,) when the pawl C will be disengaged from the ratchet-wheel D by passing over the pin H, throwing the retaining-pawl G out of the ratchet-wheel at the same time, and the rack F permitted to descend with the axle and wheels. Furthermore, the pin $i$, projecting from the rack, tends to steady the movements of the rack, and can be used for raising weights below the height of the jack.

Having described my invention, what I claim, and desire to secure by Letters Patent, is—

The lever A, pawls C G, and pawl-disengaging pin H, in combination with the ratchet-wheel D, pinion E, and rack F, substantially as and for the purposes set forth.

I also claim the slot I and pin $i$, all operating together, as shown and described, to form a new and improved carriage-jack.

In testimony whereof, I have hereunto set my signature, this eleventh day of March, A. D. 1868.

JOHN KOHLER.

Witnesses:
JOHN PAAR,
A. NEILL.